United States Patent [19]

Lane, Jr. et al.

[11] 4,410,691

[45] Oct. 18, 1983

[54] PRECIPITATION OF POLYCYCLOOLEFINS

[75] Inventors: Parley C. Lane, Jr., Cuyahoga Falls; Linwood P. Tenney, Hudson; Gerald V. Wootton, Akron, all of Ohio

[73] Assignee: The B. F. Goodrich Company, Akron, Ohio

[21] Appl. No.: 376,311

[22] Filed: May 10, 1982

[51] Int. Cl.$^3$ ............................................... C08F 6/12
[52] U.S. Cl. .................................. 528/495; 526/281; 526/283; 528/496
[58] Field of Search ............................... 528/495, 496

[56] References Cited

U.S. PATENT DOCUMENTS 4,069,376 1/1978 Minchak .............................. 526/280

Primary Examiner—Stanford M. Levin
Attorney, Agent, or Firm—George A. Kap

[57] ABSTRACT

Precipitation of a polymer from polymer cement containing about 15 to 80% solids is accomplished by mixing the cement with water and a nonsolvent near or above the boiling point of a ternary azeotrope whereby the polymer precipitates forming a slurry and the ternary azeotrope is withdrawn as a vapor, separating the polymer from the liquid phase and recycling the liquid phase to the mixing step, the polymer cement being a honey-like solution in a nonpolar solvent of a polymer prepared by ring opening polymerization in the nonpolar solvent of at least one cyclic olefin containing at least one norbornene group, the nonsolvent is selected from lower alcohols that form binary azeotropes with water, and the ternary azeotrope comprising the nonpolar solvent, the nonsolvent, and water. The process can be operated either in batchwise segments or continuously throughout.

12 Claims, 3 Drawing Figures

PRECIPITATION OF POLYCYCLOOLEFINS

BACKGROUND OF THE INVENTION

In the solution ring opening polymerization of cycloolefins that is conducted in the presence of a metathesis catalyst, the product discharged from the reactor is a honey-like cement that consists principally of a cyclic nonpolar carrier solvent in which a polymeric cycloolefin is dissolved. The polymer content is normally on the order of about 15% by weight. The polymer can be any of the family of polymers that are made by homopolymerization or copolymerization of one or more of cycloolefins that contain the norbornene group. Polymerization can be conducted batchwise or continuously.

After the honey-like cement is prepared, it is necessary to separate the polymer from its carrier solvent. In the past, steam stripping has been used exclusively in plant operations to extract the polymer from the carrier solvent. In steam stripping, the cement is injected into a jet of stream that is directed into a vessel containing hot water. As contact is made between the cement and the jet of steam, the carrier solvent is flashed off as vapor, depositing the polymers in particle form in the hot water.

Steam stripping has a number of series disadvantages. It produces a product of relatively large, coarse and variable particle size. The product contains a substantial amount of occluded water that makes it extremely difficult to dry. It produces a product that retains significant quantities of residual monomers and other residues that include high boiling reaction products and catalyst residue, all of which adversely affect the quality of the final product. Steam stripping has the inherent carry-over problem of polymer fines with the solvent vapor and steam that is continuously discharged. This carry-over results in severe plugging in the solvent recovery system. Finally, steam stripping requires large volumes of steam, far in excess of that required to vaporize the solvent in order to produce a particulate product. Steam stripping, therefore, is an inefficient, expensive, and energy-wasteful operation.

It has been a common practice to reduce impurities in the polymers of cycloolefins by water washing the cements before steam stripping. In this way, effects of certain water-sensitive impurities are eliminated. Water washing has not been practical since large volumes of contaminated water were produced that had to be disposed without creating an environmental problem.

More recently, an alternate approach was discovered for isolating polymers of cycloolefins from the carrier solvent. Pursuant to this approach, the cement is mixed in a high shear mixer with a nonsolvent in the volume ratio of about 3 to 1 nonsolvent to cement whereby the polymer precipitates out. A nonsolvent is a liquid that is miscible with the nonpolar solvent that is used in the polymerization reaction but is a nonsolvent for the polymer. Examples of suitable nonsolvents include, ethanol, propanol, isopropanol, and the like. Although on some occasions this recovery procedure produced granular, easy-to-dry product having bulk density of about 0.144 g/cc or 9 lb/ft$^3$, these results could not be reliably reproduced. What was obtained normally was a clump-like product of fine, irregular fluffy microfibers that packed cotton-like when filtered and was difficult to dry and handle, the dry product having bulk density below 0.08 g/cc or 5 lb/ft$^3$.

When polymer cement is precipitated or coagulated in a nonsolvent medium, the high polymers appear to precipitate from and the oligomers, catalyst residues and the like, remain solubilized in the mixed nonsolvent-solvent medium. Since a substantial portion of the impurities are soluble in the nonsolvent, this recovery process succeeded in removing the bulk of the impurities from the polymer. However, this approach was not entirely successful since large volumes of contaminated liquid was produced composed primarily of nonsolvent, cyclic nonpolar reaction solvent, and impurities that included residual shortstop for the polymerization reaction, adducts of the shortstop with catalyst residues, residual catalyst components, oligomers, etc. Solvent recovery of the large volume of nonsolvent-solvent liquid is difficult and expensive, and especially complicated using water-free nonsolvents which form azeotropes with water and the solvent.

More specifically, in reference to the use of a nonsolvent in polymer extraction, at bottom of col. 4 of the Minchak U.S. Pat. No. 4,069,376 it is disclosed that a polymer of one or more cycloolefins can be isolated by precipitation using a nonsolvent selected from lower alcohols such as methanol, ethanol, isopropanol, and the like. This is a known method wherein polymer cement and a nonsolvent are mixed in a high-shear intensive mixer whereby a slurry is formed. The slurry is then conveyed to a slurry tank where it is further agitated at ambient temperature, and from the slurry tank the slurry is taken to a centrifuge or a filter where the polymer is separated and taken to a drying operation, whereas the filtrate is pumped to recovery where the cyclic nonpolar solvent is separated from the nonsolvent and recovered. The filtrate is composed essentially of the cyclic nonpolar solvent and the nonsolvent hydrocarbon.

REFERENCE TO RELATED APPLICATION

The use of water and a nonsolvent hydrocarbon in azeotropic proportion for separating polycycloolefins from cements comprising polymeric cycloolefins and nonpolar solvents is disclosed in the companion application entitled "Precipitation of Polymeric Cycloolefins" filed on behalf of G. V. Wootton and L. P. Tenney, filed May 10, 1982 and bearing Ser. No. 376,367.

SUMMARY OF THE INVENTION

This invention relates to the use of water and a nonsolvent in azeotropic proportion in the precipitation of polycycloolefins from polymer cements, comprising the polymer dissolved in a nonpolar solvent, at a temperature ranging from at or near the boiling point of a ternary azeotrope of water, a nonsolvent and a nonpolar solvent to the boiling point of the polymer slurry comprising polymer particles, water, and the nonsolvent. The polycycloolefins are prepared by ring opening solution polymerization of at least one cycloolefin containing a norbornene group in a nonpolar solvent. By carrying out precipitation of the cement and subsequent extraction of the polymer slurry with water and a nonsolvent in azeotropic proportion at a temperature at or above the boiling point of the ternary azeotrope, the volume of liquid conveyed to recovery is thereby greatly reduced when compared to precipitation carried out at lower temperatures. The precipitation process can be conducted batchwise or continuously.

DETAILED DESCRIPTION OF THE INVENTION

In the precipitation of polymeric cycloolefin cements with a nonsolvent, it was discovered that water and the nonsolvents performed as well as pure nonsolvents themselves. This was a totally unexpected result inasmuch as water would be expected to substantially reduce the solubility of a cyclic nonpolar solvent in the nonsolvent, which principle is regularly employed to separate nonsolvents from hydrocarbons by water extraction. Howver, this is not observed to any extent in the precipitation of polymeric cycloolefins and subsequent extraction procedures.

This invention relates to the use of water and a nonsolvent in approximately azeotropic proportion to precipitate polycycloolefins at elevated temperatures ranging from at or near the boiling point of a ternary azeotrope to the boiling point of the polymer slurry comprising the solid polymer particles dispersed in a liquid phase containing water and nonsolvent. An azeotrope is generally defined as any one of two or more liquid compounds that form mixtures of constant boiling point whose distillates have the same composition as the original mixture. The azeotropes referred to herein are negative azeotropes that are minimum boiling mixtures. Application of this invention results in a several-fold reduction in the volume of liquid that is conveyed to the recovery operation when compared to precipitation at lower temperatures.

Figure 1:
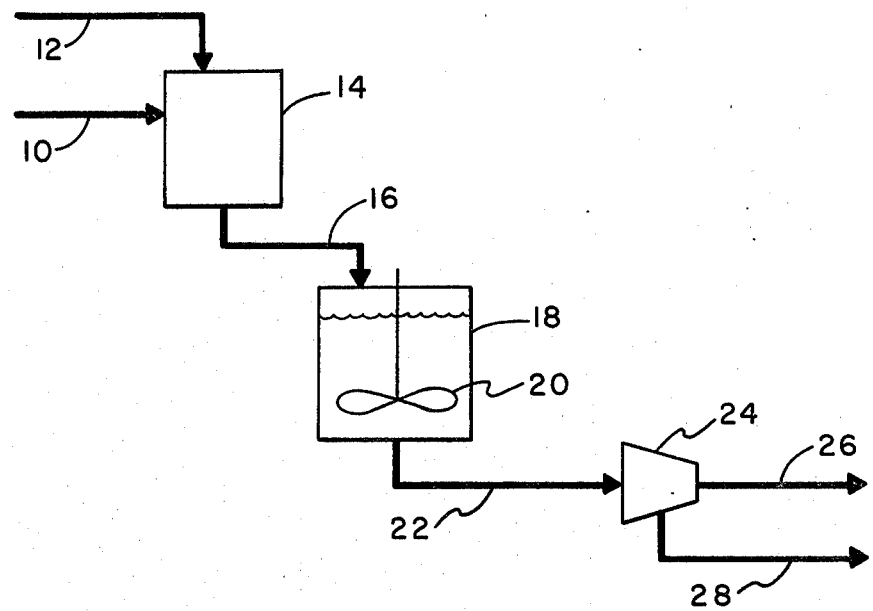
FIG. 1 is a flow diagram of a known precipitating or coagulating process whereby a polymer cement is mixed with water and a nonsolvent in azeotropic proportion to precipitate the polymer at ambient temperature or at an elevated temperature below the boiling point of the ternary azeotrope.

The reduced magnitude of the solvent recovery process that is attained by the use of the invention herein can be demonstrated by reference to the drawings herein. Precipitation of a polymer cement at ambient temperatures is illustrated in FIG. 1. To facilitate understanding of the description of the processes illustrated in FIGS. 1, 2, and 3, cyclohexane is used as an example of a nonpolar solvent and ethanol is used as an example of a nonsolvent, and it should be understood that other suitable nonpolar solvents and nonsolvents can be used. The polymer cement normally contains about 15% total polymer solids by weight, however, a preconcentrated cement can also be used wherein solids concentration is at least about 20% and up to about 80%. The processes can be conducted in batchwise segments or wholly continuously. Continuous operation described in the accompanying FIGS. 1, 2, and 3, is preferred for plant operations.

The preconcentration step is optional but when employed, affords the special advantage of removing residual impurities which can be present in the recycle to the precipitation process. In the absence of preconcentration, an obvious alternative is to send the stream to recovery for this purpose, if desired.

Referring to FIG. 1, 18.5 kg of ethanol and water in approximately azeotropic proportion is pumped through line 10 and 3.1 kg of cement are pumped through line 12 into a high shear, high intensity mixer 14 where they are mixed and then conveyed as a polymer slurry through line 16 to slurry tank 18 provided with agitator 20. The 3.1 kg of cement comprises 0.45 kg of polymer solids and 2.6 kg of a liquid that is essentially cyclohexane. Agitation is continued in the slurry tank at ambient or elevated temperature but below the boiling temperature of the ternary azeotrope of cyclohexane, ethanol, and water. Upon mixing of the cement with ethanol and water, precipitation takes place instaneously forming a polymer slurry of solid particles dispersed in a liquid medium containing principally cyclohexane, ethanol and water. From tank 18, the slurry is pumped through line 22 to centrifuge 24 where the slurry is separated into a polymer stream consisting of 0.45 kg of polymer and 0.68 kg of solvent-nonsolvent liquid mixture that is conveyed via line 26 to a drying operation and 20.4 kg of a liquid comprising principally cyclohexane, ethanol and water that is conveyed to a recovery operation by means of line 28.

Figure 2:
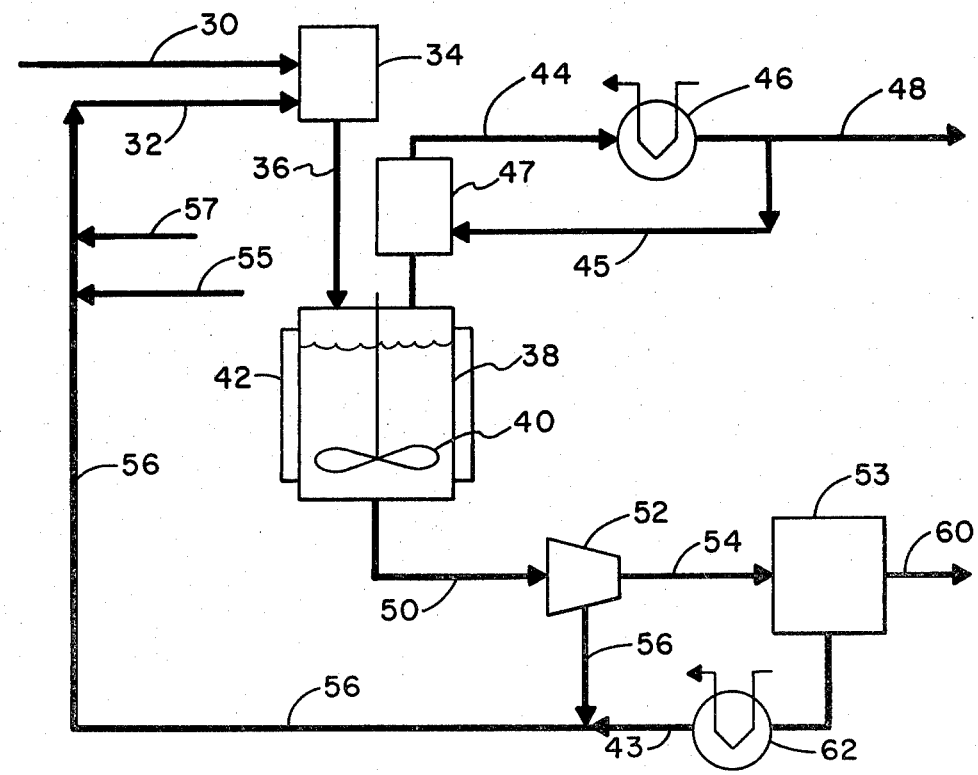
FIG. 2 is a flow diagram of a similar precipoitating process to the one illustrated in FIG. 1 except that it is carried out at a temperature ranging from at or near the boiling point of the ternary azeotrope to the boiling point of the polymer slurry.
Figure 3:
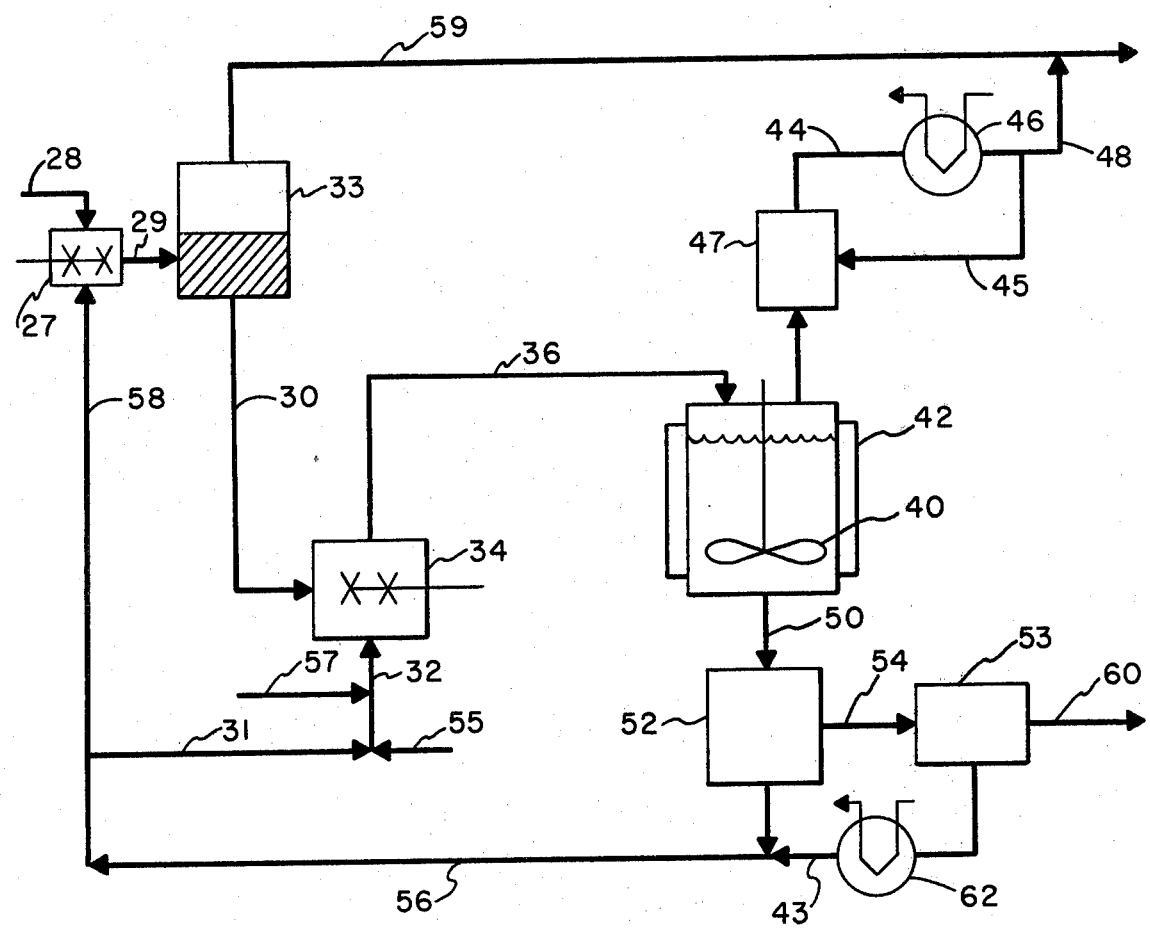
FIG. 3 is a flow diagram illustrating the FIG. 2 process with polymer cement preconcentration added.

FIG. 2 illustrates the invention described herein. As in the case of the process illustrated in FIG. 1, cement in the amount of 3.1 kg is pumped through line 30 to a high shear, high intensity mixer 34 where it is mixed with 18.5 kg of ethanol and water in azeotropic proportion that is introduced to the mixer through line 32. The 3.1 kg of cement comprises 0.45 kg of polymer and 2.6 kg of a liquid that is essentially cyclohexane with small amounts of other materials, such as molecular weight modifier. The polymer slurry formed in the mixer is coveyed via line 36 to slurry tank 38 equipped with agitator 40 and heating jacket 42. The slurry in tank 38 is agitated to facilitate suspension and extraction of the solid polymer particles and is heated to at least the boiling point of the ternary azeotrope of cyclohexane, ethanol, and water having a boiling point of 62.1° C. The ternary azeotrope has the following composition, on weight basis:

cyclohexane—76%
ethanol—17%
water—7%

The ternary azeotrope is driven off as a vapor through the top of slurry tank 38 via packed column 47 and line 44 to condenser 46 where it is condensed, the liquid amounting to 3.4 kg and pumped to a recovery operation by means of line 48.

Some fractionation of the ternary azeotropic vapor leaving the slurry tank is desirable to avoid loss of excess ethanol and water from the system. This is accomplished in column 47 by returning small amount of ternary condensate from condenser 46 via line 45 as reflux, with the required amount regulated by temperature of vapor to the condenser as in any normal distillation process.

The bottoms of the slurry tank 38, i.e., a slurry of polymer dispersed in ethanol and water is conveyed by means of line 50 to centrifuge 52 where the slurry is separated into 0.45 kg of polymer on dry basis and ethanol-water azeotrope. The polymer is taken to dryer 53 by way of line 54 and the water and ethanol mixture is recycled through line 56 into line 32 and then into mixer 34 where it is combined with additional cement. The polymer recovered from dryer 53 through line 60 contains less than 1% liquid and the liquid extracted from the wet polymer in the dryer is condensed in condenser 62 and conveyed via line 43 and into line 56. Since 18.5 kg of the ethanol-water mixture is mixed with 3.1 kg of cement and 17.7 kg of the ethanol-water mixture is recycled, the process only requires 0.8 kg of fresh ethanol-water mixture.

As was already noted, the ethanol and water that are used in the precipitation process are preferably in the azeotropic proportion of 96/4 on weight basis. Amount of water relative to the ethanol should be such as to permit the boiling off of the ternary azeotrope from slurry tank 38 and recycle of the ethanol-water from centrifuge 52 in approximately azeotropic proportion. This feature also simplifies the integration of the recovery operation that produces ethanol-water azeotrope that can be recycled directly to process. The stream in line 56 is supplemented with ethanol-water azeotrope from recovery via line 55 to make up for ethanol-water removed from the slurry tank as the ternary azeotrope with cyclohexane.

Furthermore, provision for introducing small amounts of water (stream 57) should be made for easily adjusting the relative amount of the nonsolvent and water to attain the desired azeotropic ratio for precipitation. This enables water content of the precipitation system to remain in balance since otherwise, the tendency is to lose water due to the greater amount of water removed with the cyclohexane-ethanol-water ternary azeotrope than is returned with the incoming make up ethanol binary azeotrope. This same principle applies for the FIG. 3 process described below. The process can, on the other hand, be operated without this further water addition, however, in which case, the system will operate with vapors in line 44 approaching the boiling temperature and composition of the cyclohexane-ethanol binary azeotrope (30.5 wt.% ethanol, standard boiling temperature 65° C.), making control of the operation more difficult and increasing the amount of ethanol processed through the recovery process. It should be further noted, that for different nonsolvent alcohols, the need for water addition will vary according to the content of water in each water-nonsolvent binary azeotrope relative to the associated water-nonsolvent-solvent ternary azeotrope. When employed, auxiliary water addition, described above, can be controlled by specific gravity or refractive index analysis of the recycle stream to the mixer or other similar methods known in the art.

In comparing the process of FIG. 1 with that of FIG. 2, it should be noted that whereas 21.1 kg of liquid are pumped to recovery in the FIG. 1 process, only 3.4 kg of liquid are pumped to recovery in the FIG. 2 process. Due to the capital costs, energy costs and other costs that are incurred in a recovery operation, reduction of the volume of liquid subjected to a recovery operation by a factor of 5 to 6 constitutes tremendous advantages in terms of money and time saved.

FIG. 3 shows a preferred alternate case in which preconcentrated cement is used as an extension of the FIG. 2 process. In this case, stream 56, consisting of ethanol-water recycled from the centrifuge and dryer, is split, with stream 58 being sent to the preconcentration step and stream 31 returned to the precipitation mixer, becoming stream 32, as in FIG. 2. In this case, the 15% solids polymer cement is introduced through line 28 to an inline mixer 27. The mixture is then fed to separating tank 33 through line 29. Stream 30 is preconcentrated cement containing normally 30 to 40 weight % polymer solids in contrast to 15% solids in the cement of FIG. 2. Stream 59, the nonpolar solvent-nonsolvent extract liquor from the preconcentration step, is combined with the ternary stream 48 and sent to the solvent recovery operation. Nominal quantities of materials involved in this operation for each 3.1 kg of incoming 15% solids cement, employing ethanol-water as the nonsolvent are as follows: stream 58 is 0.9 kg of ethanol-water mixture, stream 59 is 2.6 kg of cyclohexane-ethanol-water extract liquor, stream 30, now 33 weight % total solids preconcentrated cement, is 1.4 kg containing 0.45 kg of polymer solids. Stream 32, ethanol-water from recovery, of approximately the binary azeotropic composition sent to the precipitating intensive mixer, is 6.8 kg and the ternary cyclohexane-ethanol-water azeotrope vaporized and condensed from the slurry tank is 1.2 kg. Therefore, in the FIG. 3 process, the total quantity of mixed hydrocarbon liquids sent to the recovery process is nominally 3.8 kg per 0.45 kg of polymer solids precipitated as against 3.4 kg for the FIG. 2 process requiring recycling of 1.2 kg of ethanol-water mixture to precipitation versus 0.82 kg for FIG. 2. Obviously, the FIG. 3 mode of operation affords the same general level of advantage as the FIG. 2 process over the method described for FIG. 1. In addition, the FIG. 3 process affords the special advantages over the FIG. 2 process of (1) removing the bulk of impurities present in the incoming 15% total solids cement before the final precipitation step and (2) providing a means for continuously removing residual impurities extracted in the precipitation step with very small increase in nonsolvent demand for the overall operation.

It should further be noted that the obvious preferred method employed in either the FIG. 2 or FIG. 3 processes for feeding make up alcohol-water binary azeotrope back into the operations is as final product wash on the polymer cake passing through the centrifuge. In practice, this liquor is separately fed to mixer 34 along with additional slurry tank filtrate from the centrifuge, as required for precipitation.

The polymer cement, referred to above, is prepared by ring opening polymerization of cyclic olefins that contain the norbornene moiety in the presence of a metathesis catalyst comprising at least one alkylaluminum halide cocatalyst and at least one tungsten or molybdenum compound catalyst. Tungsten and molybdenum in the metal compound catalyst can be the cation, such as in a tungsten or molybdenum halide, or the anion as in a tungstate or a molybdate. Polymerization is accomplished by mixing in a reactor a monomeric cyclic olefin, or a mixture thereof with or without other copolymerizable monomers, with a cyclic nonpolar hydrocarbon solvent. A molecular weight modifier, selected from nonconjugated acyclic olefins, is then added to the reactor followed by an alkylaluminum halide cocatalyst and a tungsten or molybdenum compound catalyst. The polymerization reaction is conducted at 0° to 200° C., preferably 25° to 100° C., with stirring and produces little heat. Reaction time to completion is on the order of less than 2 hours.

Polymerization may be conducted either batchwise or continuously. The precipitation process described hereunder will perform equally well in either case, despite some differences in chemical make up of cements resulting from inherent kinetic differences existing between the two reaction modes. Continuous polymerization requires substantially less molecular weight modifier and catalyst and produces polymers of narrower molecular weight distribution than batch operation. For these and other practical considerations of a technical nature not important to the embodiment of this invention, continuous polymerization is the preferred method most regularly employed for process operations.

Reaction product that is recovered directly from the reactor is a smooth, viscous cement of honey-like consistency that comprises a polymer dissolved in a solvent. Polymer or solids concentration in the cement is about 15% and dilute solution viscosity of the polymer is normally in the range of about 0.1 to 3. Dilute solution viscosity is a measure of viscosity of a solution of 0.25 gram of polymer in one deciliter of toluene at 25° C.

The polymer cement can be preconcentrated from about 15% solids to at least about 20% solids and up to about 80% solids. Preconcentration can be accomplished by mixing the cement with about 0.2 to 1 volume of a nonsolvent per 1 volume of cement. The nonsolvent is selected from various hydrocarbons including lower alcohols and azeotropes thereof with water.

The norbornene-type monomers or cycloolefins that can be polymerized in accordance with the process described herein are characterized by the presence of the following nonbornene group identified by formula I, that can be substituted or unsubstituted:

(I)

Pursuant to this definition, suitable norbornene-type monomers include substituted and unsubstituted norbornenes, dicyclopentadienes, dihydrodicyclopentadienes, tricyclopentadiene, and tetracyclododecenes. Preferred monomers of the norbornene-type are those defined by the following formulas II and III, each containing at least one norbornene group:

 
(II) (III)

where R and $R^1$ are independently selected from hydrogen, alkyl, and aryl groups of 1 to 20 carbon atoms, and saturated and unsaturated cyclic groups of 3 to 12 carbon atoms formed by R and $R^1$ together with the two ring carbon atoms connected thereto. In a preferred embodiment, R and $R^1$ are independently selected from hydrogen and alkyl groups of 1 to 2 carbon atoms. Examples of monomers referred to herein include dicyclopentadiene, methyltetracyclododecene, 2-norbornene and other norbornene monomers such as 5-methyl-2-norbornene, 5,6-dimethyl-2-norbornene, 5-isopropyl-2-norbornene, 5-ethyl-2-norbornene, 5-butyl-2-norbornene, 5-hexyl-2-norbornene, 5-octyl-2-norbornene, and 5-dodecyl-2-norbornene.

Especially contemplated herein are homopolymers, copolymers and terpolymers of methylnorbornene, methyltetracyclododecene, and dicyclopentadiene, and preferably homopolymers of methyltetracyclododecene and copolymers of methyltetracyclododecene and methylnorbornene. The copolymers contain 1 to 75% by weight, preferably 10 to 30%, of polymerized methylnorbornene with remainder being methyltetracyclododecene whereas the terpolymers contain 1 to 75% by weight, preferably 1 to 45%, of polymerized methylnorbornene and 25 to 98% by weight, preferably 50 to 98%, of polymerized methyltetracyclododecene, with remainder being polymerized dicyclopentadiene. The norbornene-type monomers, or a mixture thereof can contain up to about 20% by weight of at least one other copolymerizable monomer.

The preferred catalyst employed in the polymerization of cycloolefins is a combination of an aluminum halide with elemental halide or an alkylaluminum halide cocatalyst and a tungsten or a molybdenum compound catalyst. The tungsten and molybdenum in the metal compound catalyst can be the cation, such as in a tungsten or a molybdenum halide, or the anion, as in a tungstate or a molybdate.

The useful molybdenum and tungsten compound catalysts include molybdenum and tungsten halides such as molybdenum petachloride, molybdenum hexachloride, molybdenum pentabromide, molybdenum hexafluoride, molybdenum pentaiodide, tungsten hexachloride, tungsten hexafluoride, and the like. Preferred catalysts are the molybdenum halides, especially molybdenum pentachloride.

The alkylaluminum halide cocatalysts are selected from aluminum halides $RAlX_2$, $R_2AlX$, $R_3Al_2X_3$, $R_3Al$, $AlX_3$, and mixtures thereof. In the formulas for the aluminum halide catalysts, R is an alkyl radical containing 1 to 12 carbon atoms, preferably about 2 to 4 carbon atoms, and X is a halogen selected from chlorine, iodine, bromine and fluorine. Specific examples of such aluminum halides include ethylaluminum dichloride, diethylaluminum monochloride, ethylaluminum sesquichloride, diethylaluminum iodide, ethylaluminum diiodide, trialkylaluminum compound with elemental iodine, propylaluminum dichloride, propylaluminum diiodide, isobutylaluminum dichloride, ethylaluminum dibromide, methylaluminum sesquichloride, and methylaluminum sesquibromide.

Although aluminum is the preferred reducing agent in the alkylaluminum halide cocatalysts, other organometallic halide reducing agents can function as well. Metals that form suitable organometallic cocatalysts include lithium, magnesium, boron, lead, zinc, tin, silicon and germanium. Also, the metallic hydrides can be substituted in whole or in part for the organometallic cocatalysts.

The molybdenum or tungsten compound catalyst, or a mixture thereof, is employed at a level of about 0.01 to 50 millimoles molybdenum or tungsten per mole of total monomer, preferably 0.1 to 10 millimoles. The molar ratio of the alkylaluminum halide to the molybdeum and/or tungsten compound catalyst is not critical and can be in the range of about 200:1 or more to 1:10, preferably from 10:1 to 2:1 of aluminum to molybdenum or tungsten.

The use of polymerization reaction solvent in the process of this invention is required. Suitable nonpolar solvents, in which the polymer described herein are soluble, include aliphatic and cycloaliphatic hydrocarbon solvents containing 4 to 10 carbon atoms such as butane, pentane, hexane, heptane, octane, cyclohexane, cyclohexane, cyclooctane and the like; aromatic hydrocarbon solvents containing 6 to 14 carbon atoms which are liquid or easily liquified such as benzene, toluene, naphthalene and the like; and substituted hydrocarbons wherein the substituents are inert, such as dichloromethane, chloroform, chlorobenzene, dichlorobenzene, and the like. In any case, it should be obvious that in the process of this invention, it is important that the solvent employed be miscible with the water-nonsolvent so as to effect precipitation of the polymer in the intensive mixer, as described herein, and on subsequent heating of the resulting slurry, to form a minimum boiling ternary azeotrope with the water and nonsolvent. Cyclohexane was found to be an excellent solvent. The solvent can be added at any point in the charging procedure, but a portion, preferably 0.1 to 10% of the total solvent, is used to dissolve the catalyst and the remainder added before the catalyst solution. Generally ½ to 2 liters of solvent is used per 100 grams of monomer.

A polymerization activator can be used but is generally not needed. Activation can be obtained by using air or peroxide or a hydroperoxide, especially the organic peroxides such as benzoyl peroxide. The activator can be employed in the range of up to 3 moles, preferably up to 1 mole, per mole of the alkylaluminum halide cocatalyst. The activator can be added at any point in the charging procedure but is preferably added last or with the tungsten or molybdenum compound catalyst.

At least one nonconjugated acyclic olefin can be used as a molecular weight modifier having at least one hydrogen on each double-bonded carbon atom and containing 2 to 12 carbon atoms, more preferably 3 to 8 carbon atoms. Examples of suitable acyclic olefins include 1-olefins, 2-olefins, 3-olefins, nonconjugated diolefins, and nonconjugated triolefins. More preferably, the nonconjugated acyclic olefins are selected from 1-olefins containing 3 to 8 carbon atoms such as 1-butene, 3-methyl-1-butene, 1-pentene, 1-hexene, 4-methyl-1-pentene, and the like. Compounds not having hydrogen atoms on double-bonded carbons are unreactive. In the process of this invention, it is important that the acyclic olefin employed boil at or below the boiling temperature of the water-nonsolvent binary azeotrope either by itself or in azeotropic composition with other system components present in the slurry tank.

The nonconjugated acyclic olefin can be used at a level of about 0.0001 to 1 mole per mole of the monomer charge. The nonconjugated acyclic olefin can be charged directly or in solution at any point in the charging procedure, but it is preferaly charged along with the monomers. When charged last, the nonconjugated acyclic olefin is preferably charged before the reaction begins.

The monomers can be added at any point in the charging procedure. Normally, however, in continuous polymerization, the monomers, the solvent, and the nonconjugated acyclic olefin are added to the reactor as a mixture together with the alkylaluminum halide cocatalyst. The tungsten or molybdenum compound catalyst is added separately in a hydrocarbon solvent. Completion of the polymerization reaction is indicated by the disappearance of the monomer in the charge, as monitored by gas chromatography.

The nonsolvent that is used with water to precipitate polymer cement is a liquid that is miscible with the nonpolar solvent used in the polymerization reaction of the monomers containing the norbornene group, however, the nonsolvent is not a solvent for the polymer. Suitable nonsolvents include alcohols containing 2 to 8 carbon atoms that form azeotropes with water, preferably lower alkyl alcohols of about 2 to 5 carbon atoms. Specific examples of suitable nonsolvents include ethyl alcohol, propyl alcohol, allyl alcohol, isopropyl alcohol, butyl alcohol, isobutyl alcohol, sec-butyl alcohol, t-amyl alcohol, and the like. The nonsolvent can be added to the mixer by itself or in admixture with an appropriate amount of water. Examples of the azeotropes that the preferred nonsolvents form with water include the ethanol-water azeotrope containing 4% water by weight, isopropanol-water azeotrope containing about 12.5% water, allyl alcohol-water azeotrope containing 27.7% water, propanol-water azeotrope containing 28.3% water, n-butanol-water azeotrope containing 42.5% water, sec-butanol-water azeotrope containing 27.3% water, isobutanol-water azeotrope containing 33% water, and t-amyl alcohol-water containing 27.5% water.

The ratio of nonsolvent and water used as a precipitant to cement can vary from about 2/1 to 15/1, preferably 3/1 to 8/1 for 15% total solids polymer cements and higher ratios for preconcentrated cements, such as about 10/1. Process economies strongly favor the lower end of the range, although at higher levels, coalescence of polymer particles in subsequent process steps is avoided. Amount of the precipitant will also depend on solids concentration of the cement, with the more concentrated cement requiring more precipitant. The polymer generally precipitates out in the form of fluffy clumps composed of a multitude of tangled fibrous strands that are normally smaller than 1 millimeter in length. The polymer is dried and subsequently compounded with various additives.

The precipitation, extraction, and recovery processes described hereunder may be conducted either in batchwise segments or wholly continuously as shown in the accompanying FIGS. 1, 2, and 3. For practical and technical reasons not important to the embodiment of this invention, the continuous mode is the preferred method to be most regularly employed for process operations.

As earlier noted, the temperature of the slurry in the slurry tank 38 is at or above the boiling point of the ternary azeotrope of a nonpolar solvent, nonsolvent, and water. Although ternary azeotrope implies the presence of the three constituents, it should be understood that it can also contain small amounts of other substances, such as the molecular weight modifier. As should be apparent, temperature of the polymer slurry should not exceed the boiling point of the nonsolvent-water binary azeotrope since such a condition can lead to disastrous results. The boiling point of the ternary azeotrope will, of course, vary depending on the specific nonpolar solvent and nonsolvent used. The following is a list of the more common ternary azeotropes of a cyclic nonpolar solvent, a lower alcohol of 2 to 5 carbon atoms, and water, together with their boiling points, wherein hexene-1 will function similarly to hexane.

| Ternary Azeotropes (Weight %) | | | |
|---|---|---|---|
| Ethanol = 17% | Water = 7% | Cyclohexane = 76% | 62.1° C. b.p. |
| Ethanol = 37% | Water = 12% | Toluene = 51% | 74.4° C. b.p. |
| Ethanol = 18.5% | Water = 7.4% | Benzene = 74.1% | 64.6° C. b.p. |
| Ethanol = 12% | Water = 3% | Hexane = 85% | 56° C. b.p. |

-continued

| Ternary Azeotropes (Weight %) | | | | | |
|---|---|---|---|---|---|
| Isopropanol | = 18.5% | Water = 7.5% | Cyclohexane | = 74% | 64.3° C. b.p. |
| Isopropanol | = 38.2% | Water = 13.1% | Toluene | = 48.7% | 76.3° C. b.p. |
| Isopropanol | = 18.7% | Water = 7.5% | Benzene | = 73.8% | 66.5° C. b.p. |
| Isopropanol-Water-Hexane | | (composition unknown) | | | 58.2° C. b.p. |
| Allyl Alcohol | = 11% | Water = 8% | Cyclohexane | = 81% | 66.2° C. b.p. |
| n-Propanol | = 10% | Water = 8.55 | Cyclohexane | = 81.5% | 66.6° C. b.p. |
| sec-Butanol-Water-Cyclohexane | | (composition unknown) | | | 67° C. b.p. |
| t-Butanol | = 21% | Water = 8% | Cyclohexane | = 71% | 65° C. b.p. |

The boiling point of a ternary azeotrope is below the boiling point of a binary azeotrope and also below the boiling point of its constituents, i.e., the nonsolvent, nonpolar solvent, and water. If the polymer slurry in the slurry tank is at or near the boiling point of the water-nonsolvent mixture, and therefore, above the boiling point of the ternary azeotrope, this condition would allow essentially all of the nonpolar solvent and modifier, and probably residual impurities as well, be flashed-off as vapor from the hot slurry to be conveyed to recovery for separation with little loss of the nonsolvent and water from the slurry. This, as was already described, allows the direct recycle of the bulk of the water-nonsolvent azeotrope without the need for further treatment after the slurry is passed through a centrifuge or a filter to separate the polymer solids. Withdrawal of a side stream shown in FIG. 3 to preconcentration or otherwise, alternately, to nonsolvent recovery, can also be employed to counter build-up of residual impurities. Such an approach substantially reduces the capacity and energy requirements of the solvent recovery system.

Conducting the precipitation operation at the elevated temperatures defined herein has other advantages. At higher temperatures, viscosity of the polymer cement is reduced, thus providing for easier processing and handling and for more efficient separation of the polymer. Furthermore, higher temperatures maximize the removal of residual materials from the individual polymer particles formed by precipitation or coagulation. This results in a better quality product through improved extraction of process impurities from the polymer.

The dried polymers described herein can be injection molded to produce machine parts, containers, electronic components, etc., or they can be extruded into profile shapes, sheets, rods, tubular products, and other mechanical products obtained by pressing, stamping, and other fabricating means. It should be understood, however, that prior to fabrication, the polymers described herein are compounded in a manner that is well known in the art.

The following example is set forth to illustrate the invention disclosed herein in greater detail in reference to the use of specific materials and conditions.

The example presented below illustrates precipitation of a polycycloolefin from a cement at an elevated temperature that is at or above the boiling point of the ternary azeotrope of a nonpolar cyclic solvent, a nonsolvent, and water.

EXAMPLE 1

This example demonstrates hot precipitation of a polycycloolefin using preconcentrated polymer cement. Preconcentration was conducted by starting with a polymer cement containing 90/10, on weight basis, of methyltetracyclododecene (MTD) and methyl norbornene (MNB) copolymer dissolved in cyclohexane. Total solids of the polymer cement was about 15% and dilute solution viscosity of the copolymer was 0.62. About 77 kg of the polymer cement and an isopropanol solution containing 12% water were added to a tank and agitated for about one-half hour. The weight ratio of the polymer cement to isopropanol was 100/40. The mixture was then allowed to separate into two phases. The top layer was removed and discarded whereas the bottom layer was diluted with cyclohexane to 15% total solids to facilitate handling. Lastly, Ethyl 330 antioxidant was added with mixing to the polymer cement in an amount of 1.5 parts per 100 parts of the polymer in the cement.

For the precipitation process, about 61.5 kg of isopropanol/water mixture in the respective weight ratio of 88/12 was added to a slurry tank and heated to reflux, i.e., 79° C., while agitating the contents of the tank. The precipitation feedstock was added to the tank at the following rates polymer cement—0.45 kg/min
isopropanol—2.77 kg/min
water—0.38 kg/min Isopropanol was preheated to 54° C. Overhead distillation rate from the tank was 0.64 kg/min and consisted of the isopropanol/water binary azeotrope and isopropanol/cyclohexane/water ternary azeotrope. This is evident from the fact that the head temperature of the vapors coming from the tank was 75° C. whereas the boiling temperature of the binary azeotrope is 80° C. and that of the ternary azeotrope, 64.3° C. Addition of the feedstock was continued until 123 kg of slurry was added to the tank while continuing to distill the azeotropes at 0.91 kg/min. Distillation was continued until the slurry level was reduced to 61.5 kg. The final slurry temperature in the tank was 79° C. and head temperatures was 76° C.

The hot slurry, at about 75° C., was filtered through a batch filter and the recovery polymer was dried in a vacuum oven. The polymer product was fibrous and clump-like having bulk density of 0.05 g/cc.

We claim:

1. Process for precipitating a polymer from a cement comprising said polymer dissolved in a solvent, said process comprising the steps of contacting said cement at an elevated temperature with a sufficient amount of a nonsolvent and water coagulant to precipitate said polymer in the form of solid particles that are dispersed in a liquid phase as a polymer slurry, and separating said polymer from said liquid phase; said contacting step being carried out at the elevated temperature from near or at the boiling point of a ternary azeotrope to the boiling point of the system whereby said ternary azeotrope is removed as a vapor; said ternary azeotrope comprising water, said solvent, and said nonsolvent that is miscible with said solvent but is a nonsolvent for said polymer and is selected from alcohols containing 2 to 8 carbon atoms; and said polymer is a reaction product formed by ring opening polymerization in said solvent of at least one norbornene-type monomer.

2. Process of claim 1 wherein said solvent is selected from cyclic nonpolar hydrocarbons that are solvents for said polymer, said nonsolvent is selected from alcohols that form binary azeotropes with water, and amount of said coagulant relative to said cement is in the ratio of 2/1 to 15/1, on volume basis.

3. Process of claim 2 wherein said polymer has dilute solution viscosity of about 0.1 to 3 and is selected from homopolymers, copolymers and terpolymers of methylnorbornene, methyltetracyclododecene and dicyclopentadiene.

4. Process of claim 3 wherein said copolymers contain 10 to 30% by weight polymerized methylnorbornene with remainder being methyltetracyclododecene and said terpolymers contain 1 to 45% by weight polymerized methylnorbornene, 50 to 98% by weight polymerized methyltetracyclododecene, with remainder being polymerized dicyclopentadiene.

5. Process of claim 1 wherein said alcohols are lower alcohols containing 2 to 5 carbon atoms; and said polymer has dilute solution viscosity of about 0.1 to 3 and is selected from homopolymers, copolymers and terpolymers of methylnorbornene, methyltetracyclododecene and dicyclopentadiene.

6. Process of claim 5 wherein the volume ratio of said coagulant to said cement is in the range of about 3/1 to 8/1; the relative amount of said nonsolvent to water in said coagulant corresponds approximately to the nonsolvent/water azeotropic composition; and said nonpolar solvent is miscible with water and said nonsolvent hydrocarbon.

7. Process of claim 4 that includes the steps of conveying said polymer slurry to a separating means where said polymer is separated from said liquid phase, recycling said liquid phase to said contacting step, and condensing said ternary azeotrope.

8. Process of claim 7 wherein said contacting step comprises mixing said recycled liquid phase and said cement in a high shear, high intensity mixer to precipitate said polymer and thus form said polymer slurry, said process further includes the steps of conveying said slurry to a tank whereby said ternary azeotrope is vaporized and is withdrawn from the tank, and conveying said polymer slurry to a separating means where said polymer is separated from said liquid phase.

9. Process of claim 7 wherein said cement has a solids concentration of about 20 to 80%, and said coagulant is selected from water-ethanol and water-isopropanol mixtures corresponding to the respective azeotropic compositions.

10. Process of claim 9 wherein said cement is of a honey-like consistency; said nonpolar solvent is a cyclic hydrocarbon liquid selected from cyclohexane, toluene, and benzene; the polymer precipitates in the form of fluffy clumps composed of a multitude of tangled fibrous strands that are smaller than 1 millimeter in length; and the relative amount of said nonsolvent to water in said coagulant corresponds approximately to the nonsolvent/water azeotropic composition.

11. Process of claim 7 including the steps of conveying a portion of said liquid phase from the separating means to a preconcentration tank containing said polymer cement, mixing said polymer cement and said liquid phase whereby phase separation takes place with one layer being preconcentrated polymer cement, and conveying said preconcentrated polymer cement to the precipitating process.

12. Process of claim 6 including the step of adding water to said coagulant to provide sufficient water for the precipitation process that is depleted in the process.

* * * * *